Figures 1, 2:
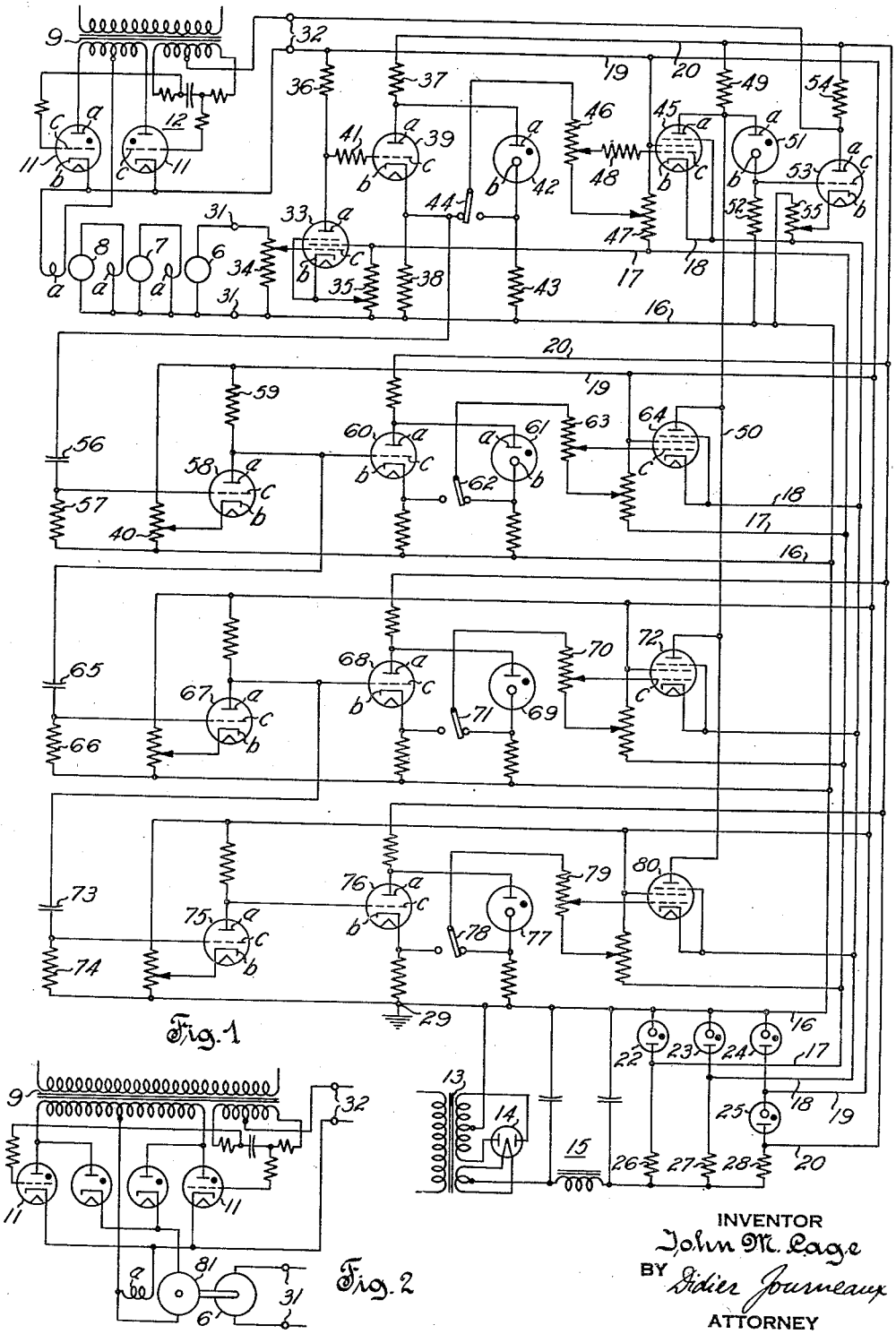

May 2, 1950

J. M. CAGE 2,506,266

VOLTAGE REGULATING SYSTEM

Filed Nov. 30, 1945

INVENTOR
John M. Cage
BY Didier Journeaux
ATTORNEY

Patented May 2, 1950

2,506,266

UNITED STATES PATENT OFFICE 2,506,266

VOLTAGE REGULATING SYSTEM

John M. Cage, Elm Grove, Wis., assignor to Allis-Chalmers Manufacturing Company, Milwaukee, Wis., a corporation of Delaware Application November 30, 1945, Serial No. 632,088

7 Claims. (Cl. 322—28)

This invention relates in general to improvements in electric control systems and more particularly to static means for rapidly overcoming in an aperiodic manner the deviations of a physical quantity from a predetermined value.

Electrical regulators involving only static means are frequently utilized for regulating physical quantities such as the voltage or the speed of a dynamoelectric machine, the temperature of a furnace, etc. The regulating process usually takes place through control elements, such as dynamoelectric machines, which delay the effect of the regulator by reason of their inductance or of their inertia. To render the regulator aperiodic, it is then necessary to provide means for anticipating the delays introduced in the regulating process by such elements, so as to cause the correction imparted to the regulated quantity to be at every instant in a constant proportion to the deviation which initiated the correction. The effect of each time delay element of a regulated system may be compensated by providing suitable connections between such elements and the regulator. These connections, however, add substantially to the complexity of the system layout and generally involve impulse transformers which are bulky, costly and difficult to adjust. More frequently, only the effect of the element having the longest time constant is compensated for, and the accuracy of the regulator must be reduced to prevent its action from becoming oscillatory.

In general, however, the operation of a regulated system involving time delays may be represented by a linear differential equation involving the regulated quantity and a limited number of its successive time derivatives. As part of the duty of the regulator is to neutralize the delays of which the time constants appear in the coefficients of the differential terms, the operation of a perfectly aperiodic regulator may be represented by a differential equation involving the same time derivatives of the differential equation of the regulated system.

It is therefore possible to build an aperiodic regulator for controlling a variable quantity through time delay elements, and arrange the regulator to be responsive only to the quantity to be regulated, by causing the appearance in the regulator circuits of voltages derived from the quantity to be regulated through suitable differentiating circuits to overcome the time delays. A uniform type of regulator can thus be made for use in connection with different types of systems to be regulated regardless of the number of delay elements involved therein. It is only necessary to provide differentiating circuits in number corresponding to the number of delay elements and to adjust such circuits in dependence upon the values of the time constants of the delay elements. This adjustment may be conveniently effected by means of conventional vacuum tube amplifiers having an adjustable voltage gain.

It is therefore an object of the present invention to provide a static aperiodic regulator for controlling a system comprising delay elements, the regulator being responsive only to the quantity to be regulated.

Another object of the present invention is to provide a static regulator for controlling a system comprising delay elements in which aperiodicity is obtained without the use of connections between the regulator and the delay elements of the regulated system.

Another object of the present invention is to provide a static aperiodic regulator which is adapted for controlling a system comprising delay elements and in which voltages proportional to time derivatives of the quantity to be regulated are produced to overcome the time delays of the regulated system.

Objects and advantages other than those above set forth will be apparent from the following description when read in connection with the accompanying drawing, in which:

Fig. 1 diagrammatically illustrates one embodiment of the present invention applied to the voltage regulation of a generator excited by means of an exciter and a pilot exciter; and Fig. 2 diagrammatically illustrates an excitation system for a direct current motor which is adapted to be regulated by means of the regulator illustrated in Fig. 1.

Referring more particularly to the drawing by characters of reference, numeral 6 designates a direct current generator of which the output voltage is to be maintained substantially at a predetermined value. The field winding 6a of the generator is supplied with current from an exciter 7 having its field winding 7a energized from a pilot exciter 8. The field winding 8a of the pilot exciter may be supplied with current from a suitable source of alternating current (not shown) through a transformer 9 associated with a suitable number of thyratrons 11. The grids 11c of the thyratrons may be energized from transformer 9 through a circuit 12 of any suitable known type which imparts a fixed phase shift to the grid alternating potential component with respect to the anode potential, a variable unidirectional potential component being superposed on the grid alternating potential component by means of the regulator to control the output voltage of generator 6.

The regulator generally comprises circuits operating at a plurality of constant unidirectional potentials, and it is generally convenient to obtain the necessary potentials from a suitable known rectifying system associated with voltage regulating glow tubes. As illustrated in Fig. 1, the rectifying system may comprise a transformer 13 energized from a suitable source of alternating current (not shown) and associated with a rectifier 14, the output voltage of which may be rendered substantially uniform by the usual filtering means 15. A plurality of conductors 16 to 20 are connected with rectifier 14 through connections including a plurality of glow tubes 22 to 25 and current limiting resistors 26 to 28. The relative potentials of conductors 16 to 20 depends on the choice of glow tubes 22 to 25. Conductor 16 may be grounded to the frame supporting the elements of the regulator as indicated at 29.

The regulator is provided with input terminals 31 on which the voltage of generator 6 or a voltage proportional to any other physical quantity to be regulated may be impressed, and with output terminals 32 to be connected with the grid circuit of thyratrons 11 or other control elements for translating the output voltage of the regulator into corrections imparted to the regulated quantity. A potential derived from the voltage impressed on terminals 31 is impressed on the control grid 33c of a vacuum tube of any suitable type such as a pentode 33 functioning as an amplifier. Grid 33c is connected with terminals 31 through a voltage divider 34 to cause the potential impressed on the grid to be within the range for which the regulator is intended and to permit adjusting the sensitiveness of the regulator. Cathode 33b is connected with conductors 16 and 17 through a voltage divider 35 to cause impression on grid 33c of an adjustable unidirectional bias potential and thereby adjust the value at which the regulator maintains the voltage of generator 6 or other quantity to be regulated. Anode 33a is connected with conductor 19 through a plate resistor 36.

As the embodiment of regulator illustrated in Fig. 1 is intended for use with different types of translating systems, the amplified potential obtained from anode 33a may be of the correct polarity for use in the associated corrective circuits in some instances and of the wrong polarity in other instances. To make potential variations of both polarities available, anode 33a is associated with a so-called phase inverter of the cathode follower type. The cathode follower comprises a resistor 37 connected with conductor 20, a resistor 38 connected with conductor 16 and a triode 39 connected between the two resistors. Grid 39c is connected with anode 33a through a connection which may include a resistor 41 to reduce the grid current of triode 39 in the event of the grid being inadvertently brought to a positive potential during adjustment of the regulator. Triode 39 and resistor 38 are connected in parallel with a constant voltage device, such as a glow tube 42, and a resistor 43. A control element responsive to the potential of anode 33a may be selectively connected with cathode 39b or with cathode 42b through a switch 44 to receive therefrom potential variations of the one or the other polarity. Switch 44 is connected with the control grid of a vacuum tube such as a pentode 45 functioning as an amplifier through connections permitting to adjust the operation of the pentode. More particularly, switch 44 is connected through a voltage divider 46 with the tap of a second voltage divider 47 connected between conductors 17, 19 and serving to adjust the quiescent operating point of pentode 45. A resistor 48 connects grid 45c with the adjustable tap of voltage divider 46 for adjusting the response of the grid potential of pentode 45 to the potential variations of switch 44.

Pentode 45 is connected between conductors 18, 20 through a plate resistor 49 which is common to pentode 45 and to further pentodes cooperating therewith. Anode 45a and a conductor 50 connected therewith are connected with conductor 16 through a constant voltage device such as a glow tube 51 and a resistor 52. Cathode 51b is connected with the grid 53c of a triode 53 serving as an amplifier and having its anode 53a connected with conductor 20 through a plate resistor 54. Cathode 53b is connected with conductors 16 and 18 through a voltage divider 55 serving to vary the adjustment of the quiescent operating point of triode 53. A voltage varying in dependence upon the plate potential of triode 53 is impressed on the grid circuits of thyratrons 11 through output terminals 32, which are connected to conductor 19 and to anode 53a. The combined voltage gain of the above described amplifying system, which may be defined as the ratio of the plate potential variations of triode 53 to the voltage variations of generator 6, may be adjusted to any desired value by varying the adjustment of voltage divider 46.

The circuits hereinabove described cause the potentials of anode 53 and of grids 11c to vary in dependence upon deviations of the voltage of generator 6 from a predetermined value. These potentials are caused to vary additionally in dependence upon the values of a plurality of time derivatives of such deviations, the number of such derivatives being equal to the number of delay elements involved in the regulation of generator 6. For the latter purpose, amplified voltages in different constant proportions to the different time derivatives of the voltage across resistor 38 are preferably obtained by means of a plurality of identical differentiating circuits which are cascaded in such manner that each circuit except the first one produces a voltage proportional to the first time derivative of a voltage appearing in the preceding circuit.

More particularly, the point of juncture of cathode 39b with resistor 38 is connected with conductor 16 through a differentiating circuit comprising a capacitor 56 serially connected with a resistor 57. To obtain from the common terminal of capacitor 56 and of resistor 57 a potential substantially proportional to the first time derivative of the potential of cathode 39b, the value of resistor 57 should be substantially zero. It is, however, generally sufficient that the time constant RC of differentiating circuit 56, 57 be negligible compared to at least the largest of the time constants of field windings 6a, 7a, 8a.

The voltage appearing across resistor 57 is amplified by means of a triode 58 connected between conductors 19 and 16 through a plate resistor 59 and through a portion of a voltage divider 40 serving to adjust the quiescent operating point of the triode. Anode 58a is connected with conductor 50 in the same manner as anode 33a through a phase inverting circuit of the cathode follower type comprising a triode 58, a grid glow tube 61 and a selector switch 62, a pentode 64 providing a second stage of an amplification, and associated resistors and voltage dividers for adjusting the magnitude and polarity of the voltage variations of conductor 50 in response to the voltages appearing across resistor 57.

The potential of anode 58a is likewise impressed on a second differentiating circuit comprising a capacitor 65 and a resistor 66 associated with a triode 67 serving as an amplifier. Triode 67 is similarly associated with a triode 68, a glow tube 69, a selector switch 71, a pentode 72 providing a second stage of amplification and associated resistors and voltage dividers. The potential of anode 67a is in turn impressed on a third differentiating circuit comprising a capacitor 73 and a resistor 74 associated with a triode 75 providing a first stage of amplification, a triode 76, a glow tube 77, a switch 78 for selecting the polarity of the amplified potential variations, and a pentode 80 providing a second stage of amplification. The time constant of the differentiating circuits 65, 66, and 73, 74 should also be negligible compared to the time constants of the field windings or other time delay elements involved in the translating system being regulated.

It will be apparent that the plate circuits of pentodes 45, 64, 72, 80 are connected in parallel with each other and in series with resistor 49 to cause the voltage drop in resistor 49 to be cumulatively responsive to the pentode currents. The pentodes and associated circuits thus constitute an amplifier cumulatively responsive to the amplified voltages of resistors 38, 57, 66, 74 to produce a combined amplified voltage which is utilized to oppose the voltage variations of generator 6.

The choice of the different electric valves and the dimensions of the other elements of the regulator may be varied to a considerable extent. It has been found that a satisfactory regulator for controlling the operation of a generator provided with a one kilowatt, 110 volt, 3600 R. P. M. pilot exciter may be made in which the critical elements are identified by the following engineering data:

| | |
|---|---|
| Thyratrons 11 | Type 3C22 |
| Pentodes 33, 45, 64, 72, 80 | Type 6SJ7 |
| Triodes 39, 53, 58, 60, 67, 68, 75, 76 | Type 6J5 |
| Glow tubes 22, 42, 61, 69, 77 | Type VR 75/30 |
| Glow tubes 23, 51 | Type VR 105/30 |
| Glow tubes 24, 25 | Type VR 150/30 |
| Resistor 49 | 20 kilo-ohms |
| Voltage divider 35 | 25 kilo-ohms |
| Resistors 37, 38, 54, voltage divider 55 | 50 kilo-ohms |
| Resistors 41, 48, 59 | 100 kilo-ohms |
| Voltage divider 40 | 105 kilo-ohms |
| Resistor 36 | 250 kilo-ohms |
| Resistor 43, voltage divider 47 | 0.5 megohm |
| Resistor 52 | 1 megohm |
| Voltage dividers 46, 63, 70, 79 | 2 megohms |
| Resistors 57, 66, 74 | 3 megohms |
| Capacitors 56, 65, 73 | 0.03 microfarad |

In operation, upon transformer 9 being energized, rectified current is supplied therefrom to field winding 8a through thyratrons 11. When transformer 13 is also energized, different potentials appear between conductors 16 to 20 to cause the different electric valves of the regulator to carry current. A voltage therefore appears between anode 58a and conductor 19 and such voltage is impressed on the grid circuits of thyratrons 11 to control the flow of current through the thyratrons.

Assuming the regulator to be properly adjusted and generator 6 to operate under steady state conditions, the different triodes and pentodes of the regulator operate at their quiescent point determined by the adjustment of the associated voltage dividers. The currents of pentodes 45, 64, 72, 80 flow through resistor 49 and produce therein a joint voltage drop which brings conductor 50 to a predetermined potential. The latter potential, less the constant voltage drop in glow tube 51, is impressed on grid 53c. The constant plate current of triode 53 produces in resistor 54 a constant voltage drop which is impressed on terminals 32 in opposition to the voltage present between conductors 19 and 20. The unidirectional potential component thus impressed on grids 11c causes the thyratrons 11 to maintain the voltage of generator 6 at a predetermined value which depends on the adjustment of voltage dividers 34 and 35.

If it is next assumed, for example, that the voltage of generator 6 suddenly drops by reason of an increase in the generator load, the potential of grid 33c drops to a corresponding extent. Pentode 33 becomes proportionally less conductive, thereby causing the potential of grid 39c to rise. Triode 39 becomes more conductive to a corresponding extent, thereby causing the potentials of cathode 39b and of grid 45c to rise. Pentode 45 becomes more conductive, causing the potentials of conductor 50 and of grid 53c to drop. Triode 53 becomes less conductive and the potential of anode 53a rises, thereby increasing the conductivity of thyratrons 11 to restore the voltage of generator 6 to the value for which voltage divider 35 is adjusted.

In the absence of differentiating circuits, the increase in the voltage impressed on field winding 8a through thyratrons 11 would cause the voltage of generator 6 to momentarily exceed its normal value. The purpose of the differentiating circuits is to reduce the effect of the regulator when the generator voltage is returning toward its normal value. While the generator voltage gradually rises back toward its normal value, the potential of cathode 39b gradually drops. Capacitor 56 carries a current which is substantially proportional to the rate of change or first time derivative of the voltage of cathode 39b to ground and therefore also proportional to the first time derivative of the voltage of generator 6 as well as of its deviation from its previously established steady state value. The flow of current through capacitor 56 then produces a voltage drop in resistor 57 which brings grid 58c to a negative potential with respect to ground. Triode 58 accordingly becomes less conductive, thereby causing the potential of grid 60c to rise. Triode 60 becomes more conductive, thus causing the potentials of anode 60a, of cathode 61b, and of grid 64c to drop, and pentode 64 to become less conductive, assuming switch 62 to be in the position shown.

Likewise capacitor 65 carries a current substantially proportional to the rate of change or first derivative of the voltage of anode 58a to ground, which voltage is in turn proportional to the first time derivative of the deviation of the voltage of generator 6 from the steady state value. The current of capacitor 65 is therefore proportional to the second time derivative of the deviation of the voltage of generator 6. The voltage drop in resistor 66 is also proportional thereto, and pentode 72 is accordingly caused to become more or less conductive in dependence upon the sign and magnitude of the second derivative.

In a similar manner grid 75c is given a positive or negative potential proportional to the third time derivative of the voltage of generator 6 and of its deviation from the steady state value to cause pentode 80 to become more or less conductive in proportion thereto.

The resistance of resistor 49 is chosen of low value compared to the plate resistance of pentodes 45, 64, 72 and 80 so that the current flow through any pentode is substantially independent of the flow of current through resistor 49 and the other pentodes. The currents of the different pentodes accordingly vary in proportion to their conductivities, which in turn vary in dependence upon the deviations of the voltage of generator 6 from the desired value and to the first three time derivatives of such deviations respectively. The variations in the different voltage drops produced in resistor 49 by the different pentode current variations are also proportional to the deviations and its time derivatives, and the voltage of resistor 49 may therefore be considered as including a variable component equal to the algebraic sum of such voltage drop variations, which component varies the common plate potential of the pentodes. The different voltages involved in such algebraic summation are given the proper polarities by proper positioning of switches 44, 62, 71 and 78.

During the above considered gradual rise of the voltage of generator 6 toward its normal value the joint effect of the current variations in pentodes 64, 72, 80 is to partially neutralize the effect of the current variations in pentode 45 to thereby prevent the regulator from raising the generator voltage above its normal value. The regulator functions in a manner converse of that above described to correct an increase of the voltage of generator 6 above the desired value.

When the regulator is properly adjusted the operation thereof is aperiodic as appears from a consideration of the mathematical relation involving the different elements of the regulator and of the system to be regulated. As is well known, when a voltage $e_0$ is impressed on field winding 8a, the resulting output voltage $e_3$ of generator 6 varies in dependence upon the value of $e_0$ in accordance with a relation of the general form $$e_0 = A\frac{d^3 e_3}{dt^3} + B\frac{d^2 e_3}{dt^2} + C\frac{de_3}{dt} + D \cdot e_3 + E$$

in which coefficients A, B, C, D, E, involve the voltage ratios of generators 6, 7, 8 and the time constants of field windings 6a, 7a, 8a.

On the other hand, as a result of the action of the regulator responsive to deviations of voltage $e_3$ and its time derivatives, the voltage $e_0$ impressed on field winding 8a varies in dependence upon the value of voltage $e_3$ in accordance with another relation of the general form $$e_0 = a\frac{d^3 e_3}{dt^3} + b\frac{d^2 e_3}{dt^2} + c\frac{de_3}{dt} + d \cdot e_3 + e$$

If, as a result of the adjustment of the regulator, coefficients $a$, $b$, $c$, $d$ are so related to the values of the time constants of field windings 6a, 7a, 8a as to be proportional to coefficients A, B, C, D, respectively, the correction imparted to the output voltage $e_3$ of generator 6 will always be proportional to the deviation of such voltage from a predetermined value. It is well known that when the latter condition is fulfilled the regulator is aperiodic.

If the time constants of field windings 6a, 7a, 8a are known, the regulator may be adjusted beforehand to operate aperiodically by adjusting voltage dividers 46, 63, 70 and 79 in the proper relation to the values of the time constants of field windings 6a, 7a, 8a for causing the condition above indicated to be fulfilled. However, it is generally more convenient to adjust the regulator by trial, making use of the fact that when voltage dividers 46, 63, 70 and 79 are sufficiently misadjusted relatively to each other and the combined voltage gain of tubes 33, 39, 45, 53 and the associated circuits is made sufficiently high, the voltage of generator 6 will fluctuate harmonically about its adjusted value.

The taps of voltage dividers 46, 63, 70, 79 are first moved to their bottom position to render the regulator unresponsive to variations of the voltage of generator 6. Voltage divider 35 is so adjusted as to cause the voltage of generator 6 to have the desired value under the prevailing operating conditions, and voltage divider 47 is so adjusted that no current flows in voltage divider 46. The tap of voltage divider 46 is then moved slowly upward to an extent sufficient to cause a slight fluctuation of the voltage of generator 6. The tap of voltage divider 63 is then also moved upward in such manner as to reduce the voltage fluctuations to the greatest possible extent. If moving the tap of voltage divider 63 causes the fluctuations to increase, switch 62 must be reversed from its original position before the voltage divider is adjusted. Voltage dividers 70 and 79 are likewise adjusted in succession to further reduce the voltage fluctuations of generator 6. The proper adjustment of the voltage dividers is thus gradually approached and eventually the voltage of generator 6 ceases to fluctuate. The tap of voltage divider 46 is then again raised to increase the combined voltage gain to a sufficient extent to cause the fluctuations to reappear. Voltage dividers 63, 70 and 79 are then readjusted so as to cause the fluctuations again to disappear. The above sequence of operations is repeated until the combined voltage gain has been increased to the extent of giving to the regulator the desired degree of sensitiveness.

After all the voltage dividers have been adjusted, the regulator may be left in operation or a non-adjustable regulator may be substituted therefor, the elements of the non-adjustable regulator being selected with values equal to the adjusted values of the corresponding elements of the adjustable regulator.

It will be understood that the regulator illustrated in Fig. 1 may be provided with any number of differentiating circuits and of associated amplifying and phase inverting elements in number equal to the number of time delay elements of the system to be regulated thereby. A regulator having a predetermined number of differentiating circuits may also be used for regulating translating systems having a known or unknown number of time delay elements less than the number of differentiating circuits. For example, the regulator illustrated in Fig. 1 may be utilized to regulate the speed of generator 6, thyratrons 11 then supplying current to the field winding 81a of the motor 81 driving generator 6 as illustrated in Fig. 2. In the latter system, the excitation of generator 6 is assumed to be constant and the generator to be unloaded so that the terminal voltage thereof is proportional to its speed.

The regulator controls the flow of current through field winding 81a generally in the manner above described to maintain constant the output voltage of generator 6, thereby also maintaining its speed constant. When the voltage of generator 6 drops as a result of a drop in the speed thereof from the desired value, the regulator should increase the negative bias potential impressed on grids 11c from anode 53a to reduce the voltage impressed on field winding 81 and thereby cause motor 81a to speed up. The potential variations of anode 53a should therefore be inverse of those occurring when the regulator is connected as shown in Fig. 1. The latter result is obtained by reversing switches 44, 62, 71 and 78 from the position shown.

The operation of the system illustrated in Fig. 2 is affected by only two important delays resulting from the inductance of field winding 81a and from the inertia of the rotating elements of generator 6 and motor 81. The relation between the voltage impressed on field winding 81a and the resulting terminal voltage of generator 6 accordingly involves only the first two derivatives of the voltage of generator 6. When the regulator is adjusted for aperiodic operation, it will therefore be found that voltage divider 79 must be so adjusted as to cause the conductivity of pentode 80 to be unresponsive to potential variations of anode 76a and therefore unresponsive to the third time derivative of the voltage of generator 6. The relative adjustment of voltage dividers 46, 63, 70 is effected beforehand or by trial in dependence upon the values of the inductance of field winding 81a and of the inertia of the rotating elements of generator 6 and motor 81.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a regulating device for controlling the value of a variable physical quantity, the combination of means for producing a first voltage varying in dependence upon deviations of said quantity from a predetermined value, means responsive to said first voltage for producing a plurality of voltages proportional to different time derivatives of said first voltage, means for reversing the polarities of certain of said voltages, and a control element cumulatively responsive to said first voltage and to each of said plurality of voltages for varying the value of said quantity.

2. In a regulating device for controlling the value of a variable physical quantity, the combination of an amplifier comprising an electric valve responsive to said quantity for producing a voltage varying in dependence upon deviations of said quantity from a predetermined value, a cathode follower circuit comprising a triode having its grid connected to the anode of said valve and a first resistor connected with the cathode of said triode, a second resistor, a constant voltage device having an anode connected with the anode of said triode and a cathode connected with said first resistor through said second resistor, a control element for varying the value of said quantity, and a switch for selectively connecting said control element with the cathode of said triode and with the cathode of said constant voltage device.

3. In a regulating device for controlling the value of a variable physical quantity, the combination of means responsive to said quantity for producing a plurality of control potentials in different predetermined relations to deviations of said quantity from a predetermined value, an amplifier comprising a plurality of electric valves having their plate circuits connected in parallel with each other and in series with a common resistor, means for impressing the several said control potentials on the control elements of the different said valves to cause the common plate potential of said valves to vary in proportion to the sum of said control voltages, and a control element responsive to said common plate potential for opposing said deviations of said quantity.

4. In combination, a translating device comprising a control member for controlling the operation thereof, means responsive to a characteristic of said device for producing a first voltage varying in dependence upon deviations of said characteristic from a predetermined value, means responsive to said first voltage for producing a plurality of voltages proportional to different time derivatives of said first voltage, means for reversing the polarities of certain of said voltages, and means cumulatively responsive to said first voltage and to each of said plurality of voltages for controlling said member.

5. In a regulating device for controlling the value of a variable physical quantity, the combination of differentiating means for producing a voltage varying in dependence upon a time derivative of deviations of said quantity from a predetermined value, an electric valve for amplifying said voltage, a cathode follower circuit comprising a triode having its grid connected to the anode of said valve and a first resistor connected with the cathode of said triode, a second resistor, a constant voltage device having an anode connected to the anode of said triode and a cathode connected to said first resistor through said second resistor, a control element for varying the value of said quantity, and a switch for selectively connecting said control element with the cathode of said triode and with the cathode of said constant voltage device.

6. In a regulating device for controlling the value of a variable physical quantity, the combination of means responsive to said quantity for producing a plurality of control potentials in different predetermined relations to deviations of said quantity from a predetermined value, means for reversing the polarities of some of said control potentials, an amplifier comprising a plurality of electric valves having their plate circuits connected in parallel with each other and in series with a common resistor, means for impressing the several said control potentials on the control elements of the different said valves to cause the common plate potential of said valves to vary in proportion to the sum of said control voltages, and a control element responsive to said common plate potential for opposing said deviations of said quantity.

7. In a regulating device for controlling the value of a variable physical quantity, the combination of means responsive to said quantity for producing a plurality of control potentials in different predetermined relations to deviations of said quantity from a predetermined value, means for reversing the polarities of some of said control potentials, an amplifier comprising a plurality of electric valves having their plate circuits connected in parallel with each other, a plurality of cathode follower circuits for impressing the several said control potentials on the control elements of the different said valves, and a control element cumulatively responsive to the currents in said electric valves for opposing said deviations of said quantity.

JOHN M. CAGE.

REFERENCES CITED

The following references are of record in the file of this patent:

UNITED STATES PATENTS

| Number | Name | Date |
|---|---|---|
| 1,703,280 | Minorsky | Feb. 26, 1929 |
| 1,988,458 | Minorsky | Jan. 22, 1935 |
| 2,002,369 | Frohmer | May 21, 1935 |
| 2,088,654 | Hull | Aug. 3, 1937 |
| 2,300,515 | Ludwig | Nov. 3, 1942 |